J. D. PENNOCK, E. C. WITHERBY, W. H. BLAUVELT, E. N. TRUMP & C. G. TUFTS.
PROCESS OF AND APPARATUS FOR PURIFYING AMMONIA.
APPLICATION FILED MAR. 30, 1909.
1,012,272. Patented Dec. 19, 1911.
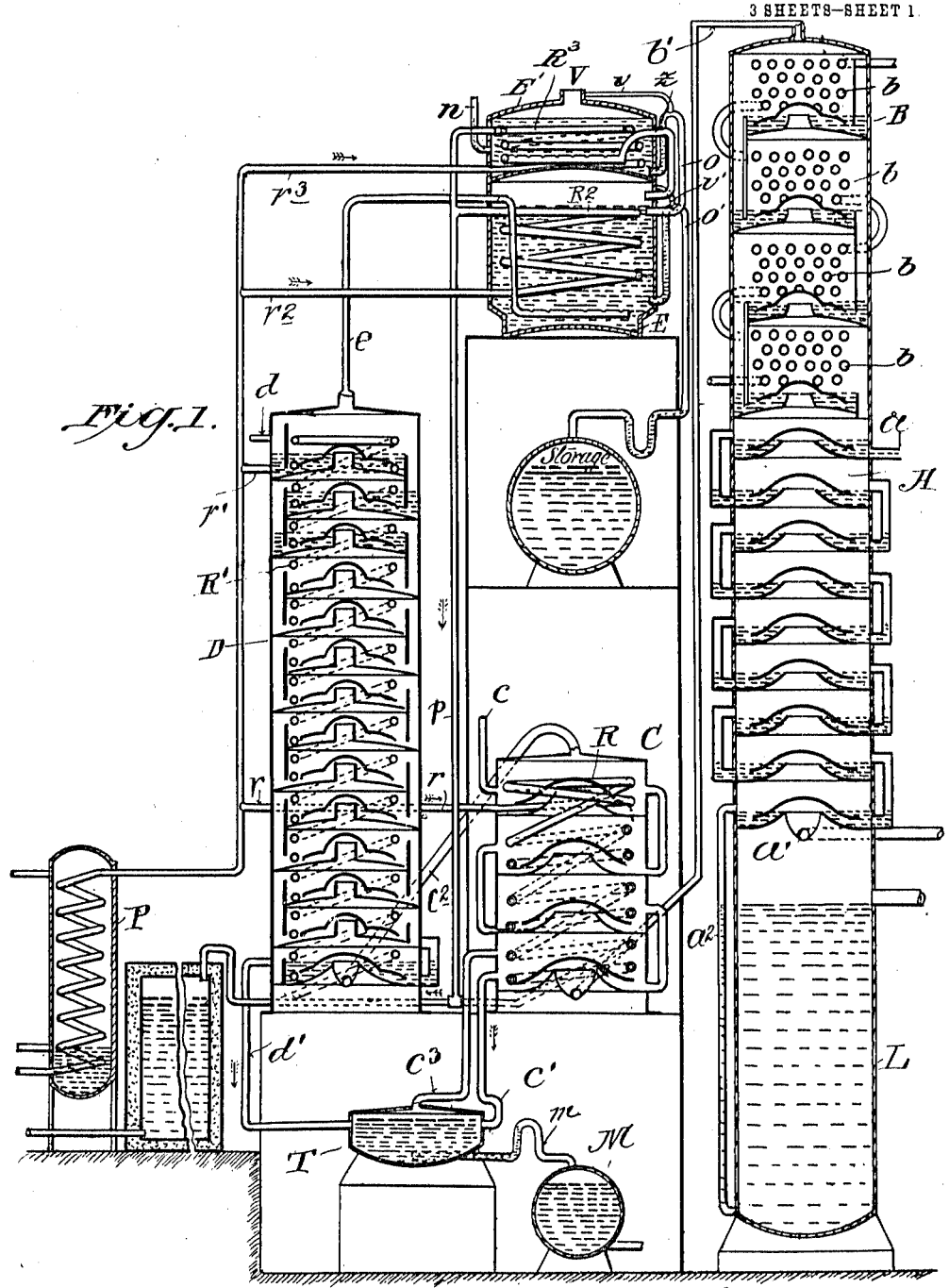

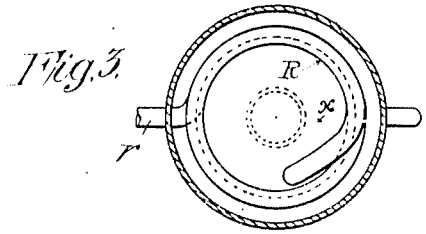
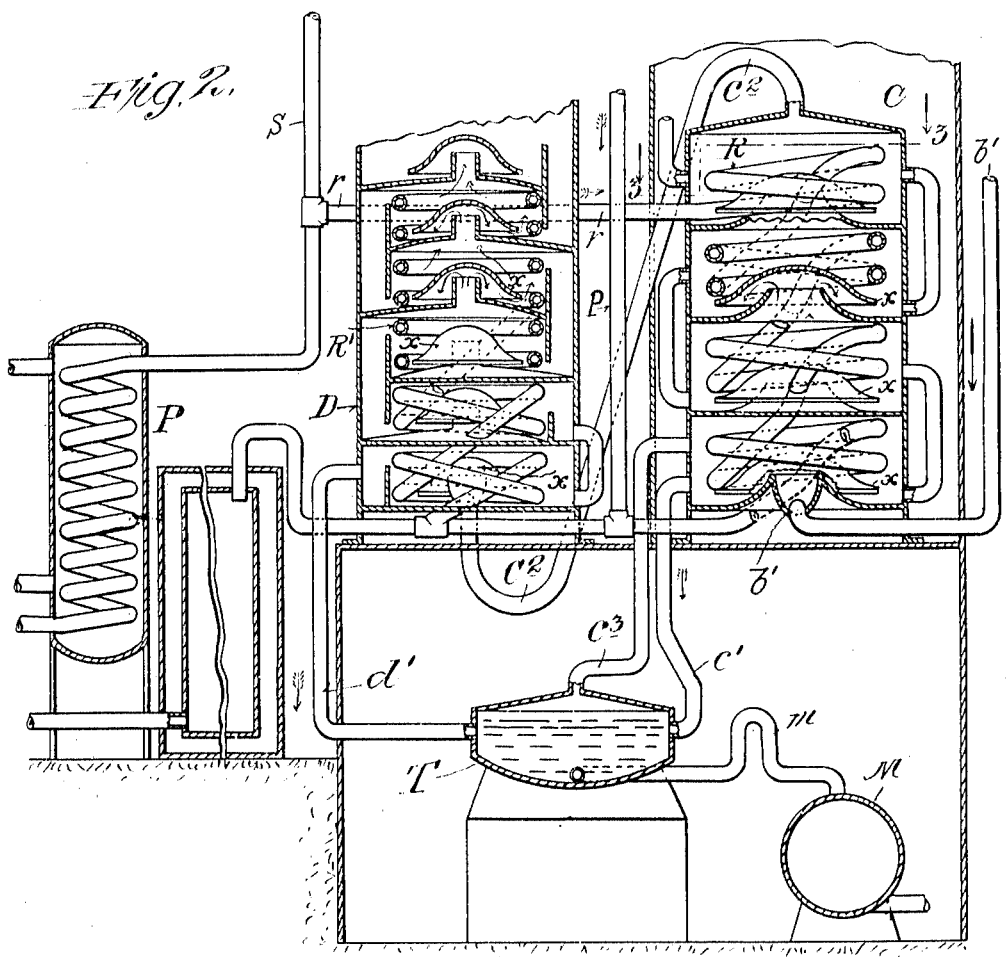

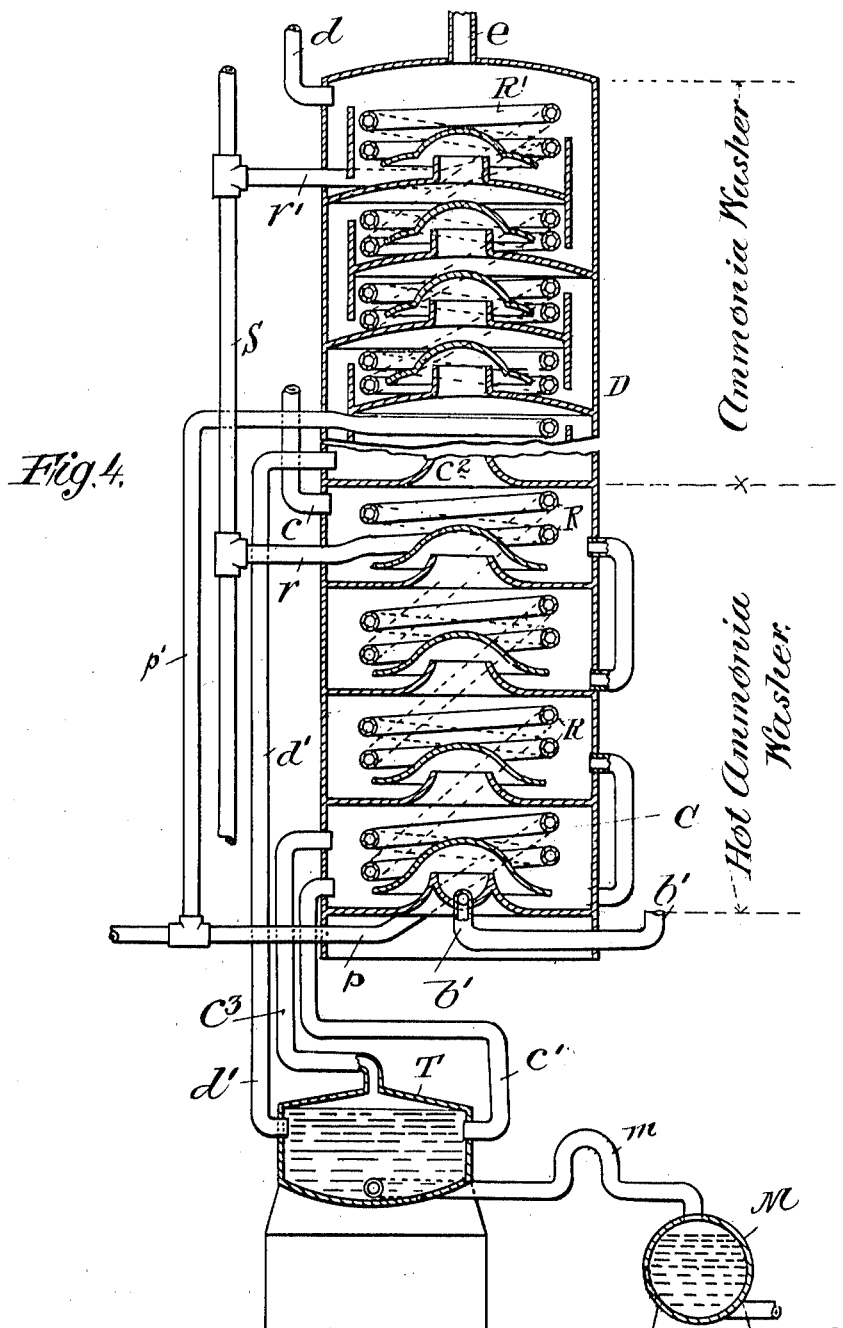

UNITED STATES PATENT OFFICE.

JOHN D. PENNOCK AND EDWIN C. WITHERBY, OF SOLVAY, AND WILLIAM H. BLAUVELT, EDWARD N. TRUMP, AND CHARLES G. TUFTS, OF SYRACUSE, NEW YORK, ASSIGNORS TO SEMET-SOLVAY COMPANY, OF SYRACUSE, NEW YORK, A CORPORATION OF PENNSYLVANIA.

PROCESS OF AND APPARATUS FOR PURIFYING AMMONIA.

1,012,272.  Specification of Letters Patent.  Patented Dec. 19, 1911.

Application filed March 30, 1909. Serial No. 486,778.

*To all whom it may concern:*

Be it known that we, JOHN D. PENNOCK and EDWIN C. WITHERBY, residing at Solvay, WILLIAM H. BLAUVELT, EDWARD N. TRUMP, and CHARLES G. TUFTS, residing at Syracuse, all in the county of Onondaga and State of New York, and citizens of the United States, have invented a new and Improved Process of and Apparatus for Purifying Ammonia, of which the following is a specification.

Our invention relates particularly to the purification of ammonia, such as is obtained in the destructive distillation of coal. As is well known, ammonia derived from this source is associated with many impurities, such as pyridin and pyridin oils, alcohol compounds, nitrils, and many other volatile organic and inorganic compounds. These impurities are harmful when present in ammonia which is to be used for chemical or medicinal purposes, and may be a source of danger, for example when present in anhydrous ammonia used in refrigerating plants, even to the extent of bursting the apparatus, with consequent waste of ammonia and possible loss of life.

Our improvements are directed to the efficient removal of these impurities so as to produce ammonia of the degree of purity required for any purpose.

Heretofore it has been known that if impure ammonia gas be passed through water saturated with ammonia certain of the impurities will be absorbed and held by the ammonia solution, but no practical means has heretofore been devised for utilizing this fact in the production of pure ammonia.

We have discovered that while certain of the impurities associated with ammonia gas are absorbed by a saturated solution of ammonia under proper conditions, certain hydro and nitro-compounds, which are very harmful impurities, are not readily absorbed by ammonia, but can be absorbed under proper conditions by the oils which are present in the crude ammonia. We have also discovered that, if ammonia gas with the accompanying impurities be passed through a saturated solution of ammonia of a low temperature approximating the freezing point of water, while the ammonia gas will pass freely certain impurities inseparable from the ammonia at a higher temperature, will be retained by the solution, and the ammonia will pass off in a substantially pure state. Taking advantage of these facts we accomplish the purification of the ammonia gas to any desired degree in the following manner. The ammonia gas with the accompanying impurities is first distilled off from the ammoniacal liquor. It is then cooled to a temperature of about 70° C., whereby it is partially dehydrated, some of the contained impurities remaining with the condensate. The gas is then scrubbed in a saturated solution of ammonia, the temperature of which ranges from that which the gas has after dehydration, or about 70° C., to about 40° C. The saturated solution of ammonia is usually supplied by the condensate resulting from the lowered temperature, but the addition of water or solution of ammonia is sometimes necessary to perfect this stage of the process. By this preliminary scrubbing at a relatively high temperature, the bulk of certain of the impurities accompanying the gas, such as naphthalene and carbonates, which will at low temperatures form solid compounds, are removed from the gas and enter into solution and are drawn off and removed with the excess of solution, as required to prevent their accumulation. After this preliminary purification the gas, containing the remaining impurities, is subjected to a second scrubbing in a saturated solution of ammonia maintained by the admission of water or a solution of ammonia, which, in either case, quickly becomes saturated with ammonia from the passing gas. In this second scrubbing the gas is subjected to a gradually decreasing temperature much lower than that attained in the preliminary scrubbing. In the course of it certain oils usually present in ammoniacal liquor are condensed and the ammonia gas being scrubbed in these oils as well as in the saturated solution of ammonia, is freed from such compounds as are not removed through direct absorption thereof by the ammonia solution. At the end of this scrubbing the purified ammonia gas passes off and is collected in any usual way. The degree of perfection of the purification will depend upon the minimum temperature to which the gases are ultimately subjected, and we find that the highest degree of purification is attained if the saturated solution of ammonia at its coldest point is kept at a temperature as low as 32° F., since certain impurities, such as alcohols and their derivatives, aceto and other nitrils, the carbylamins, etc., begin to be absorbed by the ammonia solution as this temperature is approached, and at this temperature and below it are practically completely eliminated from the passing gas. The excess of ammonia solution containing the impurities deposited in this second scrubbing is drawn off at a point where the temperature of the solution is such that union of the oils and the impurities absorbed thereby and solution of the other organic impurities having low boiling points will be maintained. Otherwise a repeated revolatilization of the impurities would take place until they would become so concentrated that no more could be absorbed, whereupon they would begin to go off with the ammonia.

The invention will be best understood by describing it in detail in connection with the accompanying drawings in Figure 1 of which we have shown a diagrammatic illustration of a form of apparatus which may be used in carrying our process into effect. Fig. 2 shows a vertical section and Fig. 3 a plan view, on an enlarged scale, of the washers in which the gas is scrubbed. Fig. 4 shows a modified arrangement of the washers.

Referring to the drawings, A indicates a still of any usual or suitable construction, into the top of which the ammoniacal liquor to be treated is admitted or pumped through pipe, a, and into the bottom of which steam is admitted through pipe, a'. The gases distilled off in the still, A, pass through a dehydrater B, where they are cooled, by contact with pipes, b, through which flows a cooling medium, to a point where the watery content is largely condensed and the gas is brought to a temperature suitable for the next step in the process.

From the dehydrater, B, the gases pass by pipe, b', to the bottom pan of a stack of superposed pans, C, constituting a washer which we call the "hot ammonia washer" (because of the relatively high temperature therein), which they enter at practically the temperature attained in the dehydrater. The upper pan of the stack, C, may be fed with water or ammonia solution through pipe, c, and the overflow resulting from this feed or from the vapor condensed in the pans, passes downward from pan to pan and, with its contained impurities, is drawn off from the bottom pan through a pipe, c', to a receiving tank, T, whence it may be drawn off through a pipe, m, to a storage tank, M, or used, or treated for the recovery of its contents in any desired way. The pans composing the washer, C, are so constructed as to provide a liquid seal between each pan and the one next above it, whereby the gases on their way through the washer are forced to pass through the liquid on their way from pan to pan. The liquid in the pans is cooled by brine or other cooling medium flowing through a refrigerating coil, R, and the size of the stack and the cooling temperature are so proportioned that the liquid in the lowermost pan is maintained at a temperature of about 70° C., and in the uppermost pan at a temperature of about 40° C., though some variations from these temperatures in either direction is permissible. Under these conditions the greater part of the carbonates and other similar impurities enter into solution and are removed from the washer without solidifying.

From the upper pan of the hot ammonia washer, C, the gases pass to the lower pan of a stack of pans, D, forming a washer called the "ammonia washer", constructed in the same manner as the washer, C.

Water or ammonia solution is continuously admitted to the top pan of the ammonia washer, D, through pipe, d, and the foul overflow is drawn off from the bottom pan through pipe, d', to the tank, T. The liquid in the pans of the ammonia washer is also cooled to the required point by brine or other cooling medium, flowing through cooling coils, R'.

If desired the pans composing the hot ammonia washer, C, and the ammonia washer, D, may be combined in a single stack, as indicated in Fig. 4, though we prefer the arrangement shown in Fig. 1, for the reason that the destructive action on the apparatus of some of the gases removed in the preliminary purification in the hot ammonia washer, C, particularly the sulfids, makes the possibility of removing and replacing the pans of this washer, without disturbing those of the ammonia washer, D, desirable. In the former case the overflow pipe, d', must be connected with the stack at a point where the temperature of the downflowing current is not so high as to expel the impurities. This temperature may be considerably above that required to effect their solution in the first place. Ordinarily the temperature of the solution in the upper pan of the hot ammonia washer, C, will be kept at about 40° C., and the gases escaping therefrom will evidently enter the lowermost pan of the ammonia washer, D, at substantially the same temperature. The temperature of the solution in the lowermost pan of the ammonia washer, D, from which the overflow is drawn off, may be reduced as much below this as the cooling liquid in the coils, R', makes possible no precautions against a low temperature being necessary in this portion of the apparatus. The temperature must, however, be brought down to a point at which revolatilization of the impurities condensed in the washer beyond this will not take place.

The temperature of the ammonia solution in the pans of the ammonia washer, D, above the lowermost pan, grows lower from pan to pan through the action of the cooling liquid flowing downward through the coils, R', so that the passing gas is progressively subjected to lower temperatures, and the impurities are deposited from point to point, until the minimum temperature at which the final purification takes place is attained. This final purification takes place somewhat below the top pan of the washer, D, since the temperature in the top pan is raised by the heat developed by the absorption of ammonia, if less than a saturated solution of ammonia is admitted to keep up the flow through the washer. The minimum temperature to which the gas is subjected in the washer, D, will be determined by the degree of purification desired. We find that the highest degree of purification is attained if the saturated solution of ammonia at its coldest point near the top of the washer, D, is kept at a temperature as low as 32° F.

By the gradual reduction of temperature in the washer, D, certain oils, such as pyridin oil, are condensed and are allowed to accumulate in the pans of the washer to such an extent that the gas is scrubbed in these as well as in the saturated solution of ammonia and is thereby freed from certain compounds which are not as readily absorbed by the ammonia solution itself.

After passing from the upper pan of the ammonia washer, D, the purified ammonia gas may be treated or collected in any usual or desired way as by being caused to pass by pipe, $e$, to an absorber, E, of any usual or suitable construction, wherein it is absorbed by water and from which it may be drawn off to a storage tank or otherwise. The absorber, as shown, consists of a lower chamber E and an upper chamber E'. Water to absorb the ammonia is admitted through pipe $n$ to upper chamber E' and flows thence through pipe $o$ to a lower chamber E and from chamber E through pipe $o'$ to a storage tank. The pipes $o$, $o'$ are connected respectively with vent pipes $v$, $v'$ to prevent siphoning. The ammonia gas to be absorbed is admitted to chamber E through pipe $e$. Any ammonia not primarily absorbed in chamber E passes to chamber E' by pipe $z$, and is absorbed by the fresh water therein. Any air that may have become trapped in the system escapes from the top of chamber E' by vent V. The solution in the absorber may also be cooled by cold water or other cooling medium flowing through the coil, $R^2$.

The refrigerated brine is supplied to the cooling coils, R, R', $R^2$, $R^3$ through pipes $r$, $r'$, $r^2$, $r^3$ from an ordinary ammonia refrigerating plant indicated at P, to which the warmed brine is returned by a common return pipe, $p$.

We have not described herein the details of construction of our apparatus, as these will be readily supplied by those skilled in the art, and may be varied in many respects without departing from the nature of our invention.

While the most perfect results are obtainable by finally passing the ammonia gas through a saturated solution thereof reduced to a temperature which is only obtainable by the application of artificially refrigerated brine, or other suitable cooling liquid of low temperature, a grade of commercial ammonia satisfactory for many purposes will result from our process under temperature conditions which can be produced by the circulation of ordinary cold water only. We therefore do not limit our invention in this respect.

What we claim as new and desire to secure by Letters Patent is:

1. The hereinbefore described process of purifying ammonia gas which consists in maintaining a descending stream of saturated solution of ammonia by contact of a downwardly flowing stream of water or ammonia solution with an upward current of ammonia gas, cooling the solution by the circulation of a cooling liquid and causing the gas to be purified to pass through such solution from below upward, whereby the different impurities accompanying the ammonia will be absorbed by the solution at different parts thereof, and drawing off the liquid overflow at successive points where the temperature is such that it will not cause revolatilization or precipitation of the impurities contained in solution at such points.

2. The hereinbefore described process of purifying ammonia gas which consists in maintaining a saturated solution of ammonia by contact of a stream of water or ammonia solution with a current of ammonia gas, cooling the solution by the circulation of a cooling liquid and causing the gas to be purified to pass through the solution, whereby the different impurities accompanying the gas to be purified will be caused to be absorbed by the solution at different parts thereof, and drawing off the liquid overflow at successive points where the temperature is such that it will not cause revolatilization or precipitation of the impurities contained in solution at such points.

3. The hereinbefore described process of purifying ammonia gas which consists in first partially purifying the gas by passing it through a saturated solution of ammonia of such temperature as to absorb the less volatile impurities, and drawing off the solution containing these impurities then passing the partially purified gas through a saturated solution of ammonia of still lower temperature, whereby the more volatile impurities are absorbed, and again drawing off the overflow at a point where the temperature is below that at which these impurities will be revolatilized.

4. The hereinbefore described process of purifying ammonia gas which consists in passing the gas through a saturated solution of ammonia cooled to temperatures at which the impurities will be absorbed thereby, and drawing off the overflow of the solution at points where the temperatures are such that the absorbed impurities will not be revolatilized.

5. The hereinbefore described process of purifying ammonia gas which consists in causing the absorption of the accompanying impurities by a cold saturated solution of ammonia, drawing off that portion of the solution containing the oils and absorbed impurities at a point where the temperature is such that they will not revolatilize, and drawing off the remainder of the solution at a point where the less volatile impurities are held thereby.

6. The hereinbefore described process of purifying ammonia gas which consists in passing the gas through a saturated solution of ammonia cooled by refrigerated brine to different temperatures in different parts thereof eventually approximating 32° F., whereby the accompanying impurities are absorbed by such solution, maintaining the solution by the admission of water or ammonia solution, and drawing off the overflow containing the impurities.

7. The hereinbefore described improvements in the art of purifying ammonia gas which consists in passing the gas to be purified through a saturated solution of ammonia of such temperature as to effect the condensation of the vaporized oils and the absorption thereby of the impurities absorbable by the oils and drawing off the condensate at a temperature at which such absorbed impurities will not be revolatilized.

8. The hereinbefore described improvement in the art of purifying ammonia gas which consists in passing the gas through a saturated solution of ammonia of such temperature as to cause condensation of the oils, scrubbing the gas in the condensed oils, and drawing off the surplus oils and solution at a temperature below that at which revolatilization will take place.

9. The hereinbefore described improvement in the art of purifying ammonia gas which consists in causing the impurities to be removed to be absorbed by a saturated solution of ammonia, maintained at different temperatures in different parts thereof, and drawing off a portion of the overflow of said ammonia solution at a point where the temperature is such that the solidifiable compounds are kept in solution.

10. In an apparatus for purifying ammonia gas the combination of a washer composed of superposed pans containing a saturated solution of ammonia, pipes for drawing off the solution from the bottom of the washer and from a point intermediate between the bottom and top thereof, refrigerating pipes in operative contact with such solution, and a refrigerating device arranged to supply a current of refrigerated brine or other cooling medium to said refrigerating pipes, substantially as set forth.

11. In an apparatus for purifying ammonia gas, the combination of a washer composed of superposed pans containing a saturated solution of ammonia, refrigerating pipes in operative contact with such solution, and means for supplying refrigerated brine to said pipes, substantially as set forth.

12. In an apparatus for purifying ammonia gas the combination of a washer composed of superposed pans containing a saturated solution of ammonia, a pipe for drawing off the solution from the bottom of the washer, and a pipe or pipes for drawing off the solution from a point or points intermediate between the bottom and the top of the washer, substantially as set forth.

13. In an apparatus for purifying ammonia the combination of a washer composed of superposed pans containing a saturated solution of ammonia, and provided with an outlet for gaseous ammonia, cooling pipes in operative contact with such solution, whereby the greatest degree of cold is applied to the solution nearest said outlet, means for maintaining the solution in the washer, and a pipe or pipes for withdrawing the overflow therefrom, substantially as set forth.

In witness whereof, we have hereunto subscribed our names this 12th day of March A. D. 1909.

JOHN D. PENNOCK.
EDWIN C. WITHERBY.
WILLIAM H. BLAUVELT.
EDWARD N. TRUMP.
CHARLES G. TUFTS.

Witnesses as to J. D. P., E. C. W., W. H. B., E. N. T.:
 WALTER E. HOPTON,
 JOHN R. WICKES.
Witnesses as to C. G. T.:
 GODLIP A. BURESH,
 WALTER L. KEEN.